United States Patent
Maede et al.

(10) Patent No.: US 8,228,478 B2
(45) Date of Patent: Jul. 24, 2012

(54) LIQUID CRYSTAL DISPLAY DEVICE

(75) Inventors: Yuji Maede, Mobara (JP); Takao Sato, Mobara (JP)

(73) Assignees: Hitachi I Displays, Ltd., Chiba-ken (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 683 days.

(21) Appl. No.: 12/379,405

(22) Filed: Feb. 20, 2009

(65) Prior Publication Data
US 2009/0237342 A1  Sep. 24, 2009

(30) Foreign Application Priority Data
Mar. 19, 2008  (JP) .................. 2008-070579

(51) Int. Cl.
  G02F 1/1343  (2006.01)
  G02F 1/1333  (2006.01)
(52) U.S. Cl. .................. 349/143; 349/139; 349/110
(58) Field of Classification Search .................. 349/139, 349/143, 110
See application file for complete search history.

(56) References Cited

U.S. PATENT DOCUMENTS

| 7,248,324 | B2 | 7/2007 | Ono et al. |
| 7,256,851 | B2* | 8/2007 | Park .............................. 349/141 |
| 2007/0177090 | A1 | 8/2007 | Shimomaki |

FOREIGN PATENT DOCUMENTS

| JP | 2007-233317 | 3/2006 |
| KR | 10-0604192 | 7/2006 |
| WO | WO 01/18597 | 9/2000 |

* cited by examiner

*Primary Examiner* — Sarah Hahm
(74) *Attorney, Agent, or Firm* — Stites & Harbison, PLLC; Juan Carlos A. Marquez, Esq.

(57) ABSTRACT

A liquid crystal display device is provided which can enhance a numerical aperture. The display has a pixel transparent conductive film electrode and a transparent conductive film counter electrode formed on an insulation film, which in turn is formed on a first substrate to cover the pixel electrode. A plurality of linear portions of the counter electrode are arranged on the pixel electrode. A gate-signal-line side of the pixel electrode of the first pixel is formed on a first-pixel side of the gate signal line and a gate-signal-line side of the pixel electrode of the second pixel is formed on a second-pixel side of the gate signal line. The gate-signal-line-side frame portion of the counter electrode of the first pixel and the gate-signal-line-side frame portion of the counter electrode of the second pixel are formed in common on the gate signal line in a striding manner.

8 Claims, 7 Drawing Sheets

LIQUID CRYSTAL DISPLAY DEVICE

The present application claims priority from Japanese application JP2008-70579 filed on Mar. 19, 2008, the content of which is hereby incorporated by reference into this application.

BACKGROUND OF THE INVENTION

1. Field of the Invention

The present invention relates to a liquid crystal display device, and more particular to an IPS (In Plane Switching)-method liquid crystal display device.

2. Background Art

As such a liquid crystal display device, there has been known a liquid crystal display device having the following constitution. Out of a pair of substrates which are arranged to face each other with liquid crystal sandwiched therebetween, in a pixel region formed on a liquid-crystal-side surface of one substrate, a first electrode having a planar shape formed of a transparent conductive film and linear second electrodes formed of a plurality of transparent conductive films are formed. Here, the first electrode is formed on the whole pixel region, and the linear second electrodes are formed in parallel to each other on an upper surface of an insulation film which is formed so as to also cover the first electrode in a state that the linear second electrodes overlap with the first electrode.

Molecules of the liquid crystal are driven by an electric field containing components parallel to the substrate between the first electrode and the second electrode and hence, the IPS-method liquid crystal display device is excellent in a so-called wide viewing angle. Further, both of these electrodes are formed of a transparent conductive film and hence, the IPS-method liquid crystal display device also exhibits an excellent numerical aperture.

Such a liquid crystal display device is usually driven by a so-called active matrix method in general. That is, the liquid crystal display device defines a region surrounded by a pair of neighboring gate signal lines and a pair of neighboring drain signal lines as a pixel region, and includes, in the pixel region, a thin film transistor which is turned on in response to a signal from the gate signal line, a pixel electrode to which a signal from the drain signal line is supplied via the turned-on thin film transistor, and a counter electrode which generates an electric field for driving liquid crystal between the pixel electrode and the counter electrode.

With respect to a liquid crystal display device having such constitution, there has been known a liquid crystal display device in which the first electrode functions as the pixel electrode and the second electrode functions as the counter electrode or a liquid crystal display device in which the first electrode functions as the counter electrode and the second electrode functions as the pixel electrode.

Such a liquid crystal display device is disclosed in WO01/018597 (patent document 1), for example.

SUMMARY OF THE INVENTION

However, in the above-mentioned liquid crystal display device, it is necessary to supply a video signal to the pixel electrode independently for every pixel and hence, the pixel electrode of the pixel and the pixel electrode of another pixel which is arranged adjacent to the pixel are formed in a pattern which are separated from each other physically as well as electrically.

However, the pixel electrode is arranged such that a gap is formed between the pixel electrode and the gate signal line or the drain signal line which defines the pixel (in a state that the pixel electrode does not overlap with the gate signal line or the drain signal line). Accordingly, when a signal is supplied to the gate signal line, for example, lines of electric force which start from the gate signal line terminate at the respective pixel electrodes on both sides of the gate signal line.

These lines of electric force generate an electric field which becomes a cause of so-called leaking of light around the gate signal line and hence, a black matrix (light blocking film) which sufficiently covers the gate signal line is formed on a substrate opposite to the gate signal line by way of liquid crystal.

In this case, a width of the black matrix becomes larger than a width of the gate signal line and hence, the enhancement of a numerical aperture of the pixel is impeded, and there has been a demand for overcoming such a drawback.

Accordingly, it is an object of the present invention to provide a liquid crystal display device which can increase a numerical aperture.

To briefly explain typical inventions among inventions described in this application, they are as follows.

(1) The present invention is directed to a liquid crystal display device having a first substrate and a second substrate which are arranged to face each other with liquid crystal sandwiched therebetween, wherein the first substrate forms a plurality of gate signal lines and a plurality of drain signal lines on a liquid-crystal-side surface thereof, assuming a region surrounded by a pair of neighboring gate signal lines and a pair of neighboring drain signal lines as a pixel region of one pixel, the pixel includes a thin film transistor which is turned on in response to a signal from the gate signal line, a pixel electrode to which a signal from the drain signal line is supplied via the thin film transistor, and a counter electrode which generates an electric field for driving the liquid crystal between the pixel electrode and the counter electrode which are formed on the liquid-crystal-side surface of the first substrate, the pixel electrode is formed of a transparent conductive film having a planar shape which is formed in each pixel region on a first insulation film which is formed on the first substrate so as to cover the gate signal line, the counter electrode is constituted of a transparent conductive film which includes a plurality of linear portions arranged parallel to each other and a frame portion which connects end portions of the linear portions to each other, the transparent conductive film of the counter electrode being formed on a second insulation film which is formed on the first substrate so as to cover the pixel electrode, and the plurality of linear portions of the counter electrode being arranged on the pixel electrode in an overlapping manner, and assuming two pixels which are arranged adjacent to each other with the gate signal line formed as a boundary therebetween as a first pixel and a second pixel respectively, a gate-signal-line side of the pixel electrode of the first pixel is formed on a first-pixel side of the gate signal line in an overlapping manner, and a gate-signal-line side of the pixel electrode of the second pixel is formed on a second-pixel side of the gate signal line in an overlapping manner, and the gate-signal-line-side frame portion of the counter electrode of the first pixel and the gate-signal-line-side frame portion of the counter electrode of the second pixel are formed in common on the gate signal line in a striding manner.

(2) In the liquid crystal display device having the constitution (1), the liquid crystal display device forms a light blocking film which is arranged so as to overlap with the gate signal line on the second substrate, and a width of the light blocking film is set smaller than a width of the gate signal line.

(3) In the liquid crystal display device having the constitution (1), assuming two pixels which are arranged adjacent to each other with the drain signal line formed as a boundary therebetween as one pixel and another pixel respectively, a drain-signal-line side of the pixel electrode of said one pixel is formed on one-pixel side of the drain signal line in an overlapping manner, and a drain-signal-line side of the pixel electrode of said another pixel is formed on another-pixel side of the drain signal line in an overlapping manner, and the drain-signal-line-side frame portion of the counter electrode of said one pixel and the drain-signal-line-side frame portion of the counter electrode of said another pixel are formed in common on the drain signal line in a striding manner.

(4) The present invention is also directed to a liquid crystal display device having a first substrate and a second substrate which are arranged to face each other with liquid crystal sandwiched therebetween, wherein the first substrate forms a plurality of gate signal lines and a plurality of drain signal lines on a liquid-crystal-side surface thereof, assuming a region surrounded by a pair of neighboring gate signal lines and a pair of neighboring drain signal lines as a pixel region of one pixel, the pixel includes a thin film transistor which is turned on in response to a signal from the gate signal line, a pixel electrode to which a signal from the drain signal line is supplied via the thin film transistor, and a counter electrode which generates an electric field for driving the liquid crystal between the pixel electrode and the counter electrode which are formed on the liquid-crystal-side surface of the first substrate, the counter electrode is formed of a transparent conductive film having a planar shape which is formed in a state that the transparent conductive film of the counter electrode extends over the neighboring pixel striding over at least the gate signal line, the transparent conductive film of the counter electrode being formed on a first insulation film which is formed on the first substrate so as to cover the gate signal line, the pixel electrode is formed of a transparent conductive film which includes a plurality of linear portions arranged parallel to each other and a frame portion which connects end portions of the linear portions to each other, the transparent conductive film of the pixel electrode being formed in each pixel region on a second insulation film which is formed on the first substrate so as to cover the counter electrode, and the plurality of linear portions of the pixel electrode being arranged on the counter electrode in an overlapping manner, and assuming two pixels which are arranged adjacent to each other with the gate signal line formed as a boundary therebetween as a first pixel and a second pixel respectively, a gate-signal-line-side frame portion of the pixel electrode of the first pixel is formed on a first-pixel side of the gate signal line in an overlapping manner, and a gate-signal-line-side frame portion of the pixel electrode of the second pixel is formed on a second-pixel side of the gate signal line in an overlapping manner.

(5) In the liquid crystal display device having the constitution (4), the liquid crystal display device forms a light blocking film which is arranged so as to overlap with the gate signal line on the second substrate, and a width of the light blocking film is set smaller than a width of the gate signal line.

(6) In the liquid crystal display device having the constitution (4), assuming two pixels which are arranged adjacent to each other with the drain signal line formed as a boundary therebetween as one pixel and another pixel respectively, a drain-signal-line-side frame portion of the pixel electrode of said one pixel is formed on one-pixel side of the drain signal line in an overlapping manner, and a drain-signal-line side of the pixel electrode of said another pixel is formed on another-pixel side of the drain signal line in an overlapping manner.

(7) The present invention is also directed to a liquid crystal display device having a first substrate and a second substrate which are arranged to face each other with liquid crystal sandwiched therebetween, wherein the first substrate forms a plurality of gate signal lines and a plurality of drain signal lines on a liquid-crystal-side surface thereof, assuming a region surrounded by a pair of neighboring gate signal lines and a pair of neighboring drain signal lines as a pixel region of one pixel, the pixel includes a thin film transistor which is turned on in response to a signal from the gate signal line, a pixel electrode to which a signal from the drain signal line is supplied via the thin film transistor, and a counter electrode which generates an electric field for driving the liquid crystal between the pixel electrode and the counter electrode which are formed on the liquid-crystal-side surface of the first substrate, the pixel electrode is formed of a transparent conductive film having a planar shape which is formed in each pixel region on a first insulation film which is formed on the first substrate so as to cover the drain signal line, the counter electrode is formed of a transparent conductive film which includes a plurality of linear portions arranged parallel to each other and a frame portion which connects end portions of the linear portions to each other, the transparent conductive film of the counter electrode being formed on a second insulation film which is formed on the first substrate so as to cover the pixel electrode, and the plurality of linear portions of the counter electrode being arranged on the pixel electrode in an overlapping manner, and assuming two pixels which are arranged adjacent to each other with the drain signal line formed as a boundary therebetween as a first pixel and a second pixel respectively, a drain-signal-line side of the pixel electrode of the first pixel is formed on a first-pixel side of the drain signal line in an overlapping manner, and a drain-signal-line side of the pixel electrode of the second pixel is formed on a second-pixel side of the drain signal line in an overlapping manner, and the drain-signal-line-side frame portion of the counter electrode of the first pixel and the drain-signal-line-side frame portion of the counter electrode of the second pixel are formed in common on the drain signal line in a striding manner.

(8) The present invention is also directed to a liquid crystal display device having a first substrate and a second substrate which are arranged to face each other with liquid crystal sandwiched therebetween, wherein the first substrate forms a plurality of gate signal lines and a plurality of drain signal lines on a liquid-crystal-side surface thereof, assuming a region surrounded by a pair of neighboring gate signal lines and a pair of neighboring drain signal lines as a pixel region of one pixel, the pixel includes a thin film transistor which is turned on in response to a signal from the gate signal line, a pixel electrode to which a signal from the drain signal line is supplied via the thin film transistor, and a counter electrode which generates an electric field for driving the liquid crystal between the pixel electrode and the counter electrode which are formed on the liquid-crystal-side surface of the first substrate, the counter electrode is formed of a transparent conductive film having a planar shape which is formed in a state that the transparent conductive film of the counter electrode extends over the neighboring pixel striding over at least the drain signal line, the transparent conductive film of the counter electrode being formed on a first insulation film which is formed on the first substrate so as to cover the drain signal line, the pixel electrode is formed of a transparent conductive film which includes a plurality of linear portions arranged parallel to each other and a frame portion which connects end portions of the linear portions to each other, the transparent conductive film of the pixel electrode being formed in each pixel region on a second insulation film which is formed on the first substrate so as to cover the counter electrode, and the plurality of linear portions of the pixel electrode being arranged on the counter electrode in an overlapping manner, and assuming two pixels which are arranged adjacent to each other with the drain signal line formed as a boundary therebetween as a first pixel and a second pixel respectively, a drain-signal-line-side frame portion of the pixel electrode of the first pixel is formed on a first-pixel side of the drain signal line in an overlapping manner, and a drain-signal-line-side frame portion of the pixel electrode of the second pixel is formed on a second-pixel side of the drain signal line in an overlapping manner.

Here, the present invention is not limited to the above-mentioned constitutions and various modifications are conceivable without departing from the technical concept of the present invention. Further, examples of the constitution of the present invention other than the above-mentioned constitutions will become apparent due to the whole description of this specification and drawings.

According to the liquid crystal display device of the present invention, the liquid crystal display device can realize the increase of the numerical aperture.

Other advantageous effects obtained by the present invention will become apparent due to the description of the whole specification.

DESCRIPTION OF THE PREFERRED EMBODIMENTS

Embodiments of the present invention are explained in conjunction with drawings. Here, in the respective drawings and respective embodiments, identical or similar constitutional elements are given the same symbols, and their repeated explanation is omitted.
(Embodiment 1)
(Whole Constitution)

Figure 2:
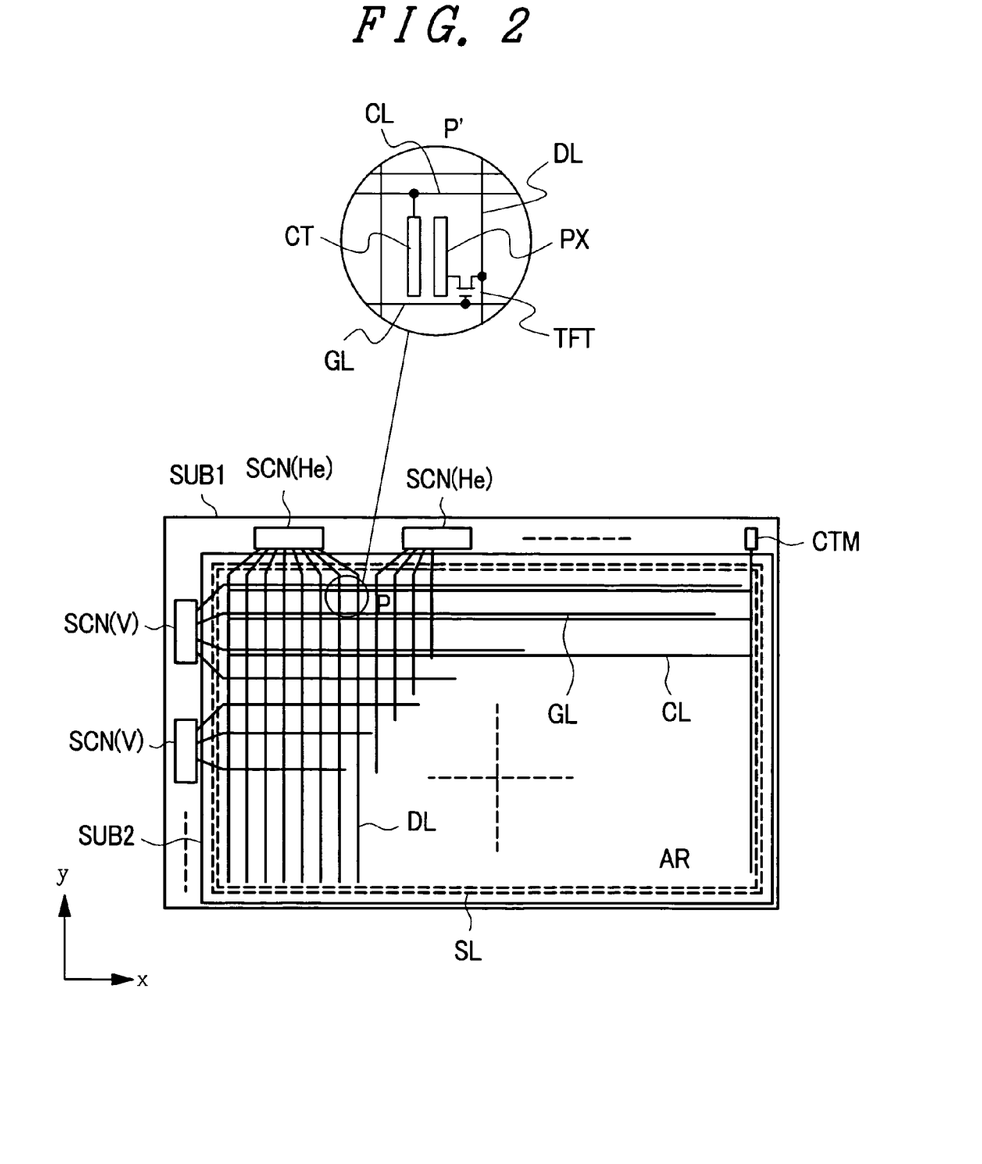
FIG. 2 is a plan view showing the schematic constitution of the liquid crystal display device of the present invention.

FIG. 2 is a whole constitutional view showing one embodiment of the liquid crystal display device of the present invention.

In FIG. 2, the liquid crystal display device is configured such that a pair of substrates consisting of a substrate SUB1 and a substrate SUB2 which is arranged to face each other in an opposed manner and is made of glass, for example, forms an envelope, and liquid crystal (not shown in the drawing) is sandwiched between the substrate SUB1 and the substrate SUB2. The liquid crystal is sealed in a space formed between the substrate SUB1 and the substrate SUB2 using a sealing member SL which also performs a function of fixing the substrate SUB1 and the substrate SUB2, and a region which is surrounded by the sealing member SL constitutes a display region AR.

An area of the substrate SUB1 is set larger than an area of the substrate SUB2 and hence, for example, the substrate SUB1 has regions which are exposed from the substrate SUB2 at a left side portion and an upper side portion thereof in the drawing. A plurality of semiconductor devices SCN(V) which is arranged parallel to each other is mounted on the region of the left side portion of the substrate SUB1, and a plurality of semiconductor devices SCN(He) which is arranged parallel to each other is mounted on a region of an upper side portion of the substrate SUB1. The plurality of semiconductor devices SCN(V) constitutes a scanning signal drive circuit and is connected to gate signal lines GL described later, and the plurality of semiconductor devices SCN (He) constitutes a video signal drive circuit and is connected to drain signal lines DL described later.

The gate signal lines GL which extend in the x direction and are arranged parallel to each other in the y direction in the drawing and the drain signal lines DL which extend in the y direction and are arranged parallel to each other in the x direction in the drawing are formed on a liquid-crystal-side surface of the substrate SUB1 within the display region AR. A rectangular region which is surrounded by the pair of neighboring gate signal lines GL and the pair of neighboring drain signal lines DL constitutes a region in which a pixel is formed. Due to such constitution, the respective pixels are arranged in a matrix array within the display region AR. Left end portions of the respective gate signal lines GL extend to the outside of the display region AR after getting over the sealing member SL and, thereafter, are connected to output terminals of the semiconductor devices SCN (V) arranged in the vicinity of the display region AR, and scanning signals (voltages) are supplied to the gate signal lines GL by the semiconductor devices SCN(V). Upper end portions of the respective drain signal lines DL extend to the outside of the display region AR after getting over the sealing member SL and, thereafter, are connected to output terminals of the semiconductor devices SCN (He) arranged in the vicinity of the display region AR, and video signals (voltages) are supplied to the drain signal lines DL by the semiconductor devices SCN(He).

As shown in a circular frame P' which is an enlarged view of a portion in the drawing which is described by a circular frame P, for example, the pixel includes a thin film transistor TFT which is turned on in response to a scanning signal from the gate signal line GL, a pixel electrode PX to which the video signal from the drain signal line DL is supplied via the thin film transistor TFT in an ON state, and a counter electrode CT to which a reference signal (voltage) is applied so as to generate an electric field by making use of a potential difference between the pixel electrode PX and the counter electrode CT. The pixel electrode PX and the counter electrode CT are formed on the same substrate SUB1, and an electric field includes an electric field component which is parallel to a surface of the substrate SUB1 in a portion thereof. A method which moves (drives) liquid crystal molecules using such an electric field is referred to as a lateral-electric field (In Plane Switching) method. Here, to the counter electrode CT, the reference signal is applied through a counter voltage signal line CL which is arranged parallel to the gate signal line GL, the counter voltage signal line CL extends after getting over the sealing member SL and is connected to a counter voltage terminal CTM which is formed on the surface of the substrate SUB1.

In the above-mentioned embodiment, the scanning signal drive circuit V and the video signal drive circuit He are mounted on the substrate SUB1. However, mounting of these circuits is not limited to the above-mentioned constitution. That is, semiconductor devices (each semiconductor device constituted by mounting a semiconductor chip on a flexible printed circuit board) which are formed by a so-called tape-carrier method may be arranged in a state that the semiconductor devices extend between the substrate SUB1 and the printed circuit board not shown in the drawing.

(Constitution of Pixel)

Figure 1:
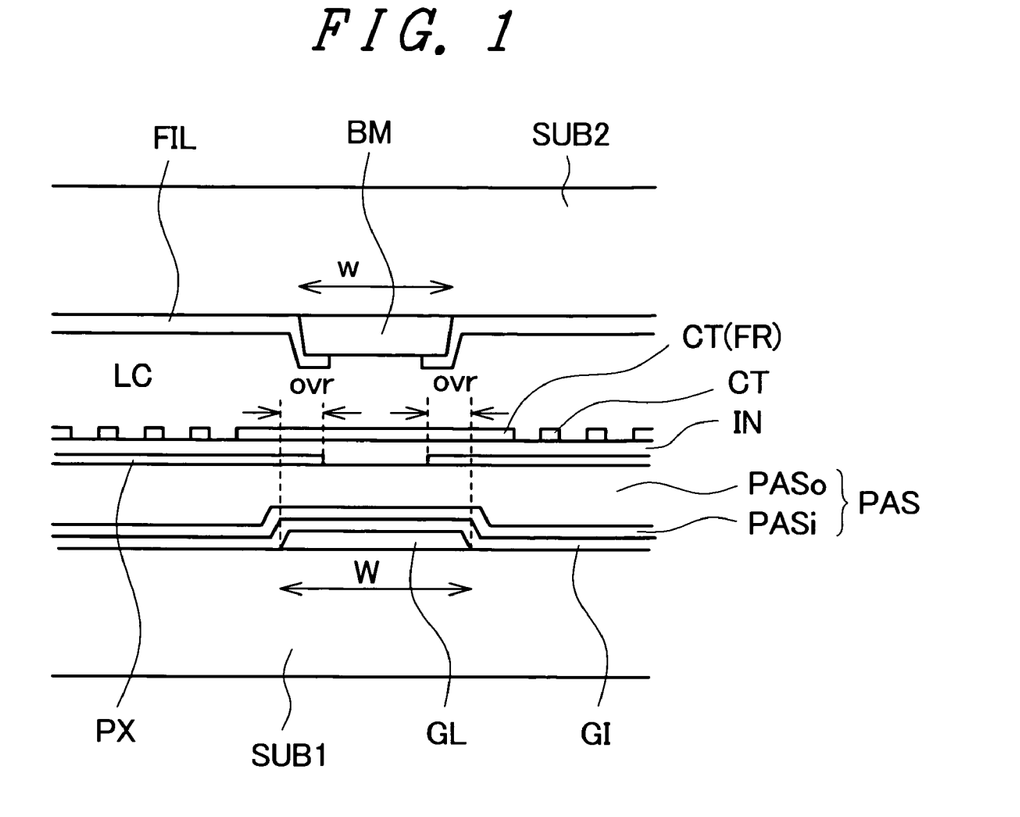
FIG. 1 is a cross-sectional view of essential parts of of a liquid crystal display device according to an embodiment 1 of the present invention.
Figure 3:
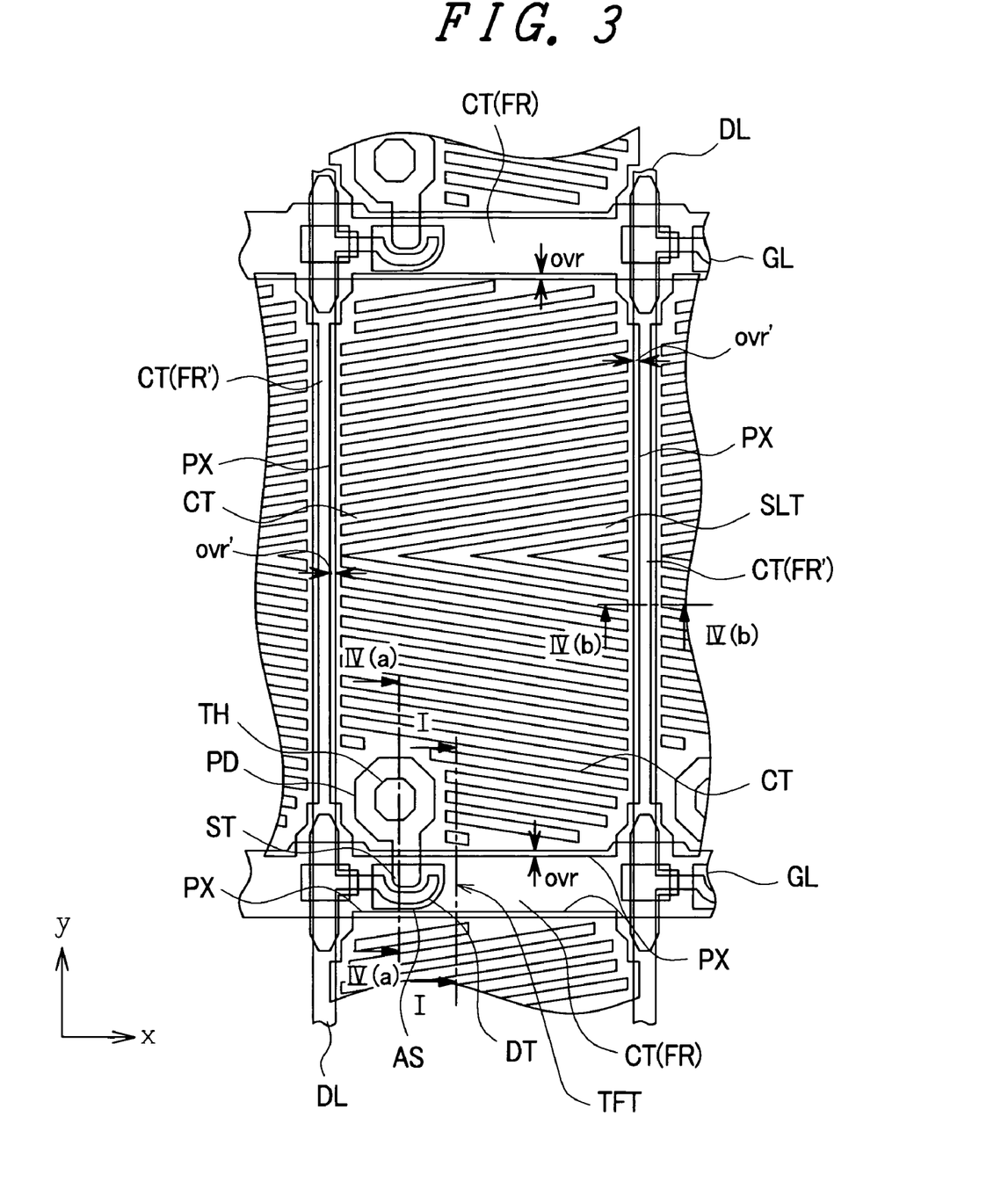
FIG. 3 is a plan view of a pixel according to the embodiment 1 of the liquid crystal display device of the present invention.
Figure 4A:
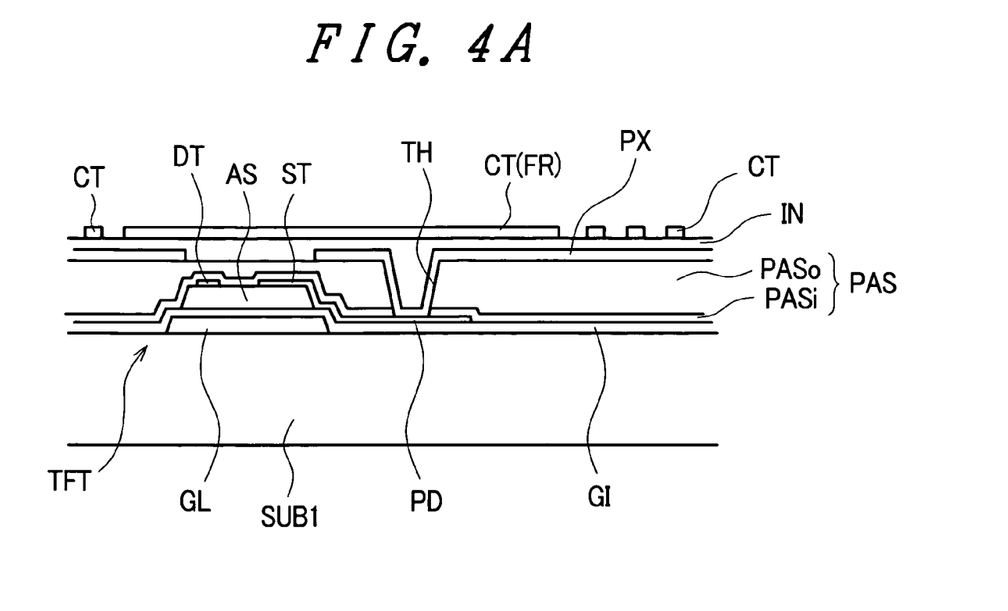
FIG. 4A is a cross-sectional view taken along a line IV(a)-IV(a) in FIG. 3.
Figure 4B:
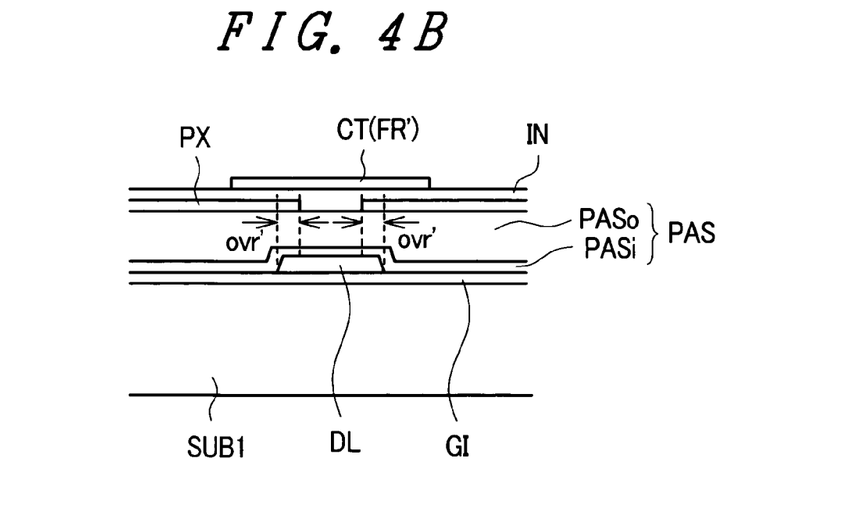
FIG. 4B is a cross-sectional view taken along a line IV(b)-IV(b) in FIG. 3.

FIG. 3 is a plan view showing one embodiment of the constitution of the pixel which is formed on the substrate SUB1. Further, FIG. 1 is a cross-sectional view taken along a line I-I in FIG. 3, FIG. 4A is a cross-sectional view taken along a line IV(a)-IV(a) in FIG. 3, and FIG. 4B is a cross-sectional view taken along a line IV(b)-IV(b) in FIG. 3. Here, FIG. 1 shows the cross section of the pixel including the substrate SUB2.

First of all, in FIG. 3, on a liquid-crystal-side surface (front surface) of the substrate SUB1, the gate signal lines GL extending in the x direction in the drawing are arranged parallel to each other in the y direction. The pixel region is formed of a region which is surrounded by the respective gate signal lines GL and the drain signal lines DL described later.

Further, an insulation film GI (see FIG. 1, FIG. 4A and FIG. 4B) is formed on the surface of the substrate SUB1 so as to cover the gate signal lines GL. The insulation film GI functions as a gate insulation film for the thin film transistor TFT in a thin-film-transistor-TFT forming region described later, and a film thickness of the insulation film GI is set to a thickness suitable for the gate insulation film.

A non-crystalline semiconductor layer AS made of amorphous silicon, for example, is formed on a portion of an upper surface of the insulation film GI which overlaps with a portion of the gate signal lines GL. The semiconductor layer AS constitutes a semiconductor layer of the thin film transistor TFT.

Further, the drain signal lines DL which extend in the y direction and are arranged parallel to each other in the x direction in the drawing are formed on the surface of the substrate SUB1. At an intersection portion between the drain signal line DL and the gate signal line GL, the drain signal line DL extends on the gate signal line GL toward the thin film transistor TFT forming region. The extending portion of the drain signal line DL extends to and reaches an upper surface of the semiconductor layer AS thus constituting a drain electrode DT of the thin film transistor TFT.

Further, a source electrode ST which is formed simultaneously with the drain signal line DL and the drain electrode DT is formed on the semiconductor layer AS in a state that the source electrode ST faces the drain electrode DT in an opposed manner. The source electrode ST extends toward the pixel region from a position above the semiconductor layer AS, and an extending portion of the source electrode ST includes a pad portion PD. The pad portion PD forms a portion which is electrically connected with the pixel electrode PX described later and has an area larger than an area of the portion of the source electrode ST arranged above the semiconductor layer AS.

Due to such constitution, the thin film transistor TFT is formed of an MIS (Metal Insulator Semiconductor)-type transistor having the so-called inversely-staggered structure in which a portion of the gate signal line GL constitutes the gate electrode.

On the front surface of the substrate SUB1, a protective film PAS formed of a stacked body which is obtained by sequentially stacking an inorganic insulation film PASi and an organic insulation film PASo, for example, is formed in a state that the protective film PAS also covers the thin film transistor TFT. By forming an upper layer of the protective film PAS using an organic insulation film PASo, a surface of the protective film PAS can be leveled.

Further, on an upper surface of the protective film PAS, the pixel electrode PX is formed using a transparent conductive film such as an ITO film (Indium Tin Oxide) film, for example. The pixel electrode PX is constituted as a surface electrode having a planar shape which is formed so as to cover the substantially whole area of the pixel region for every pixel. In this embodiment, an upper side of the pixel electrode PX in the drawing is formed to overlap with a pixel side of the gate signal line GL which is arranged on an upper side of the pixel in the drawing (indicated by symbol ovr in the drawing), and a lower side of the pixel electrode PX in the drawing is formed to overlap with a pixel side of the gate signal line GL which is arranged on a lower side of the pixel in the drawing (indicated by symbol ovr in the drawing). Due to such constitution, as shown in FIG. 1, out of respective sides of the gate signal line GL which extend parallel to each other in the running direction of the gate signal line GL, the pixel electrode PX of the pixel overlaps with one side of the gate signal line GL (indicated by symbol ovr in the drawing), and a pixel electrode PX of another pixel which is arranged adjacent to the above-mentioned pixel with the gate signal line GL formed as a boundary therebetween overlaps with another side of the gate signal line GL (indicated by symbol ovr in the drawing). Further, returning to FIG. 3, a left side of the pixel electrode PX in the drawing is formed to overlap with a pixel-electrode-PX side of the drain signal line DL which is arranged on a left side of the pixel electrode PX in the drawing (indicated by symbol ovr' in the drawing), and a right side of the pixel electrode PX in the drawing is formed to overlap with a pixel side of the drain signal line DL which is arranged on a right side of the pixel in the drawing (indicated by symbol ovr' in the drawing). Due to such constitution, as shown in FIG. 4B, out of respective sides of the drain signal line DL which extend parallel to each other in the running direction of the drain signal line DL, the pixel electrode PX of the pixel overlaps with one side of the drain signal line (indicated by symbol ovr' in the drawing), and a pixel electrode PX of another pixel which is arranged adjacent to the above-mentioned pixel with the drain signal line DL formed as a boundary therebetween overlaps with another side of the drain signal line DL (indicated by symbol ovr' in the drawing).

Here, the pixel electrode PX is electrically connected to the pad portion PD via a through hole TH (see FIG. 4A) which is formed in the protective film PAS so as to expose the pad portion PD of the source electrode ST of the thin film transistor TFT.

On the front surface of the substrate SUB1, an insulation film IN (see FIG. 1, FIG. 4A and FIG. 4B) which is formed of an inorganic insulation film is formed so as to cover the pixel electrodes PX. The insulation film IN functions as a dielectric film for forming a holding capacitance between the pixel electrode PX and the counter electrode CT described later which is formed on an upper surface of the insulation film IN.

The counter electrode CT is formed of a transparent conductive film such as an ITO (Indium Tin Oxide) film, for example. Further, the counter electrode CT is formed of a plurality of linear electrodes which is arranged parallel to each other in a state that these linear electrodes overlap with the pixel electrode PX. That is, the counter electrode CT is formed by forming a plurality of slits SLT which are arranged parallel to each other in the transparent conductive film which extends to and reaches the neighboring pixels from the pixel after getting over the gate signal lines GL and the drain signal lines DL for every pixel region. Here, the counter electrode CT provided for every pixel region is configured such that the plurality of linear electrodes which is arranged parallel to each other is integrally connected to frame portions CT(FR), CT(FR') which are connected with each other around the linear electrodes.

Further, returning to FIG. 3, the frame portion CT (FR) of the counter electrode CT on an upper side of the drawing is formed in common with a frame portion CT (FR) of the counter electrode CT of another pixel which is arranged adjacent to the pixel on a lower side of the drawing with the upper gate signal line GL formed as a boundary therebetween, and the common frame portion CT(FR) overlaps at least with the gate signal line GL. Further, the frame portion CT(FR) of the counter electrode CT on a lower side of the drawing is formed in common with a frame portion CT (FR) of the counter electrode CT of another pixel which is arranged adjacent to the pixel on an upper side of the drawing with the gate signal line GL on a lower side of the drawing formed as a boundary therebetween, and the common frame portion CT(FR) overlaps at least with the gate signal line GL. Due to such constitution, as shown in FIG. 1, the frame portion CT(FR) of the counter electrode CT is arranged such that the frame portion CT (FR) covers a gap portion between the pixel electrodes PX of the respective pixels which are arranged adjacent to each other with the gate signal line GL formed as a boundary therebetween above the gate signal line GL, and includes overlapping portions ovr which overlap with the respective pixel electrodes PX.

Accordingly, as can be clearly understood also from FIG. 1, the gate signal line GL and an area surrounding the gate signal line GL are completely covered with the pixel electrodes PX and the counter electrodes CT. Due to such constitution, all of lines of electric force which are generated from the gate signal line GL which constitutes a start point of lines of electric force are terminated at the pixel electrodes PX or the counter electrodes CT, and there exists no possibility that the lines of electric force reach a liquid-crystal-LC-side layer. Accordingly, the liquid crystal arranged in the vicinity of the gate signal line GL is not influenced at all by the lines of electric force generated from the gate signal line GL and hence, in each pixel, molecules of the liquid crystal LC can be normally driven in a range which also covers a region close to the gate signal line GL. Further, lines of electric force generated from the pixel electrode PX of the neighboring pixel can also be terminated at the counter electrode CT which includes the overlapping portion ovr between the pixel electrode PX and the counter electrode CT and hence, it is also possible to prevent the liquid crystal molecules from being influenced by the lines of electric force generated from the pixel electrode of the neighboring pixel. Accordingly, a width w of a black matrix (light blocking film) BM which is formed on the substrate SUB2 side so as to overlap with the gate signal lines GL can be decreased compared to a width of the conventional black matrix BM thus increasing a numerical aperture of the pixel. In this case, according to this embodiment, the overlapping portion ovr between the pixel electrode PX and the counter electrode CT is configured to be positioned above the gate signal line GL and hence, the width w of the black matrix BM can be set smaller than a width W of the gate signal line GL. Here, in FIG. 1, color filters FIL are formed in the respective pixel regions of the pixels which are arranged adjacent to each other with the black matrix BM formed as a boundary therebetween on a liquid-crystal-side surface of the substrate SUB2.

Further, by forming the overlapping portion ovr between the pixel electrode PX and the counter electrode CT above the gate signal line GL, end portions of the slits SLT of the counter electrode CT can be formed close to the gate signal line GL thus increasing a region of the counter electrode CT which functions as an electrode. Also from this viewpoint, it is possible to increase the numerical aperture of the pixel.

Further, returning to FIG. 3, the frame portion of the counter electrode CT on a left side of the drawing is formed in common with a frame portion of the counter electrode CT of another pixel which is arranged adjacent to the pixel on a right side of the drawing with the drain signal line DL formed on a left side of the drawing as a boundary therebetween, and the common frame portion CT(FR') overlaps at least with the drain signal line DL. Further, the frame portion CT(FR') of the counter electrode CT on a right side of the drawing is formed in common with a frame portion CT (FR') of the counter electrode CT of another pixel which is arranged adjacent to the pixel on a left side of the drawing with the drain signal line DL formed on a right side of the drawing as a boundary therebetween, and the common frame portion CT(FR') is configured to overlap at least with the drain signal line DL. Due to such constitution, as shown in FIG. 4B, the frame portion CT(FR') of the counter electrode CT is arranged such that the frame portion CT(FR') covers a gap portion between the pixel electrodes PX of the respective pixels which are arranged adjacent to each other with the drain signal line DL formed as the boundary therebetween above the drain signal line DL, and includes the overlapping portions ovr' which overlap with the respective pixel electrodes PX.

Accordingly, as can be clearly understood also from FIG. 4B, the drain signal line DL and an area surrounding the drain signal line DL are completely covered with the pixel electrodes PX and the counter electrodes CT. Due to such constitution, all of lines of electric force which is generated from the drain signal line DL which constitutes a start point of lines of electric force are terminated at the pixel electrodes PX or the counter electrodes CT, and there exists no possibility that the lines of electric force reach a liquid-crystal-LC-side layer. Further, lines of electric force from the pixel electrode PX of the neighboring pixel can be also terminated at the counter electrode CT which includes an overlapping portion ovr' between the pixel electrode PX and the counter electrode CT and hence, it is also possible to prevent the liquid crystal molecules from being influenced by the lines of electric force from the pixel electrode of the neighboring pixel. Accordingly, the liquid crystal arranged in the vicinity of the drain signal line DL is not influenced by the lines of electric force generated from the drain signal line DL and hence, in each pixel, the molecules of the liquid crystal LC can be normally driven in a range which also covers a region close to the drain signal lines DL. Accordingly, although not shown in FIG. 4B, when the black matrix (light blocking film) BM is formed on the substrate SUB2 side in a state that the black matrix BM overlaps with the drain signal lines DL, a width of the black matrix BM can be decreased compared to a width of a conventional black matrix thus increasing the numerical aperture of the pixel. In this case, the overlapping portion between the pixel electrode PX and the counter electrode CT is positioned above the drain signal line DL and hence, the width of the black matrix BM can be set smaller than a width of the drain signal line DL.

In the pixel shown in FIG. 3, the semiconductor layer of the thin film transistor TFT is made of an amorphous material. However, the pixel may include a thin film transistor TFT which is formed of a semiconductor layer which is usually referred to as polysilicon. The same goes for embodiments described later.

Further, in the pixel shown in FIG. 3, the black matrix BM is formed on the substrate SUB2 side so as to overlap with the drain signal lines DL. However, the black matrix BM may not always be made to overlap with the drain signal lines DL. The same goes for the embodiments described later.

Further, in the pixel shown in FIG. 3, in the same manner as the gate signal lines GL, also in the drain signal line DL side, the respective pixel electrodes PX of the pixels which are arranged adjacent to each other with the drain signal line DL formed as a boundary therebetween overlap with the drain signal line DL, and the drain signal line DL is covered with the counter electrode CT. However, it may be possible that such constitution is adopted on the gate signal line GL side but is not adopted on the drain signal line DL side. This is because the width of the drain signal line DL is extremely narrow compared to the width of the gate signal line GL. The same goes for the embodiments described later. As an opposite case, it maybe possible that the constitution explained in conjunction with this embodiment is adopted on the drain signal line DL side but is not adopted on the gate signal line GL side.

With respect to the constitution of the pixel explained in conjunction with the embodiment 1, to simplify the explanation of the constitution, an alignment film which constitutes an uppermost layer on respective liquid-crystal sides of the substrate SUB1 and the substrate SUB2 is omitted from the drawing. The same goes for the embodiments described hereinafter.

(Embodiment 2)

Figure 5:
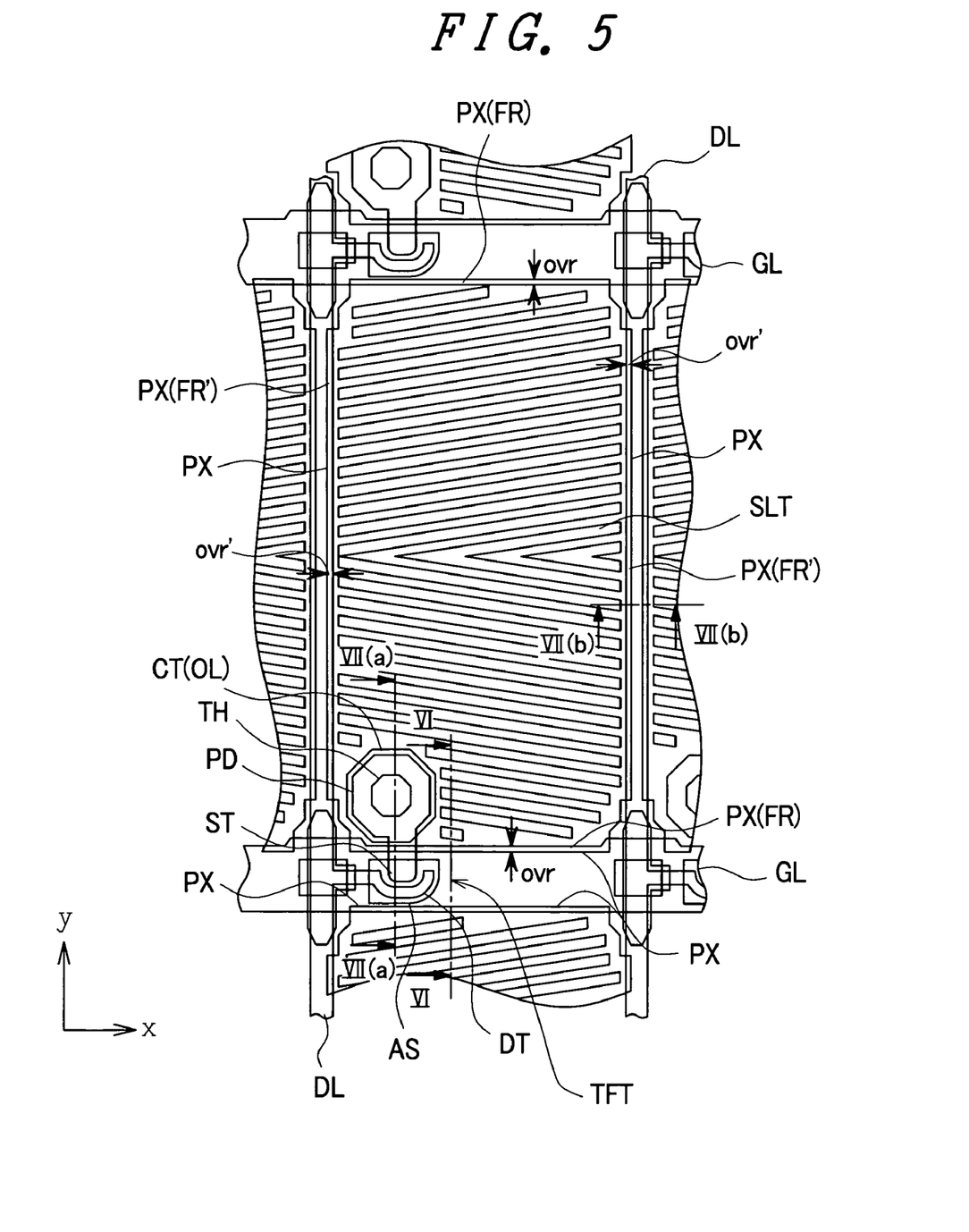
FIG. 5 is a plan view of a pixel according to an embodiment 2 of a liquid crystal display device of the present invention.
Figure 6:
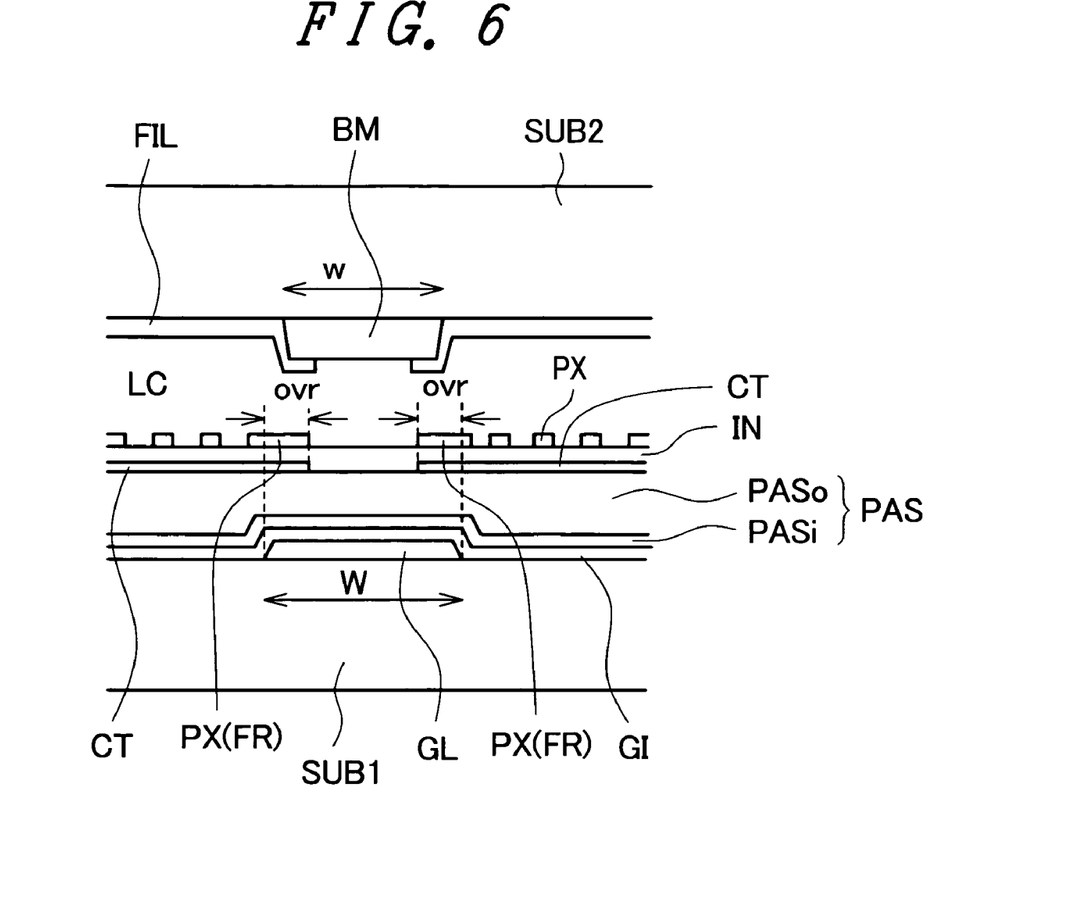
FIG. 6 is a cross-sectional view taken along a line VI-VI in FIG. 5.
Figure 7A:
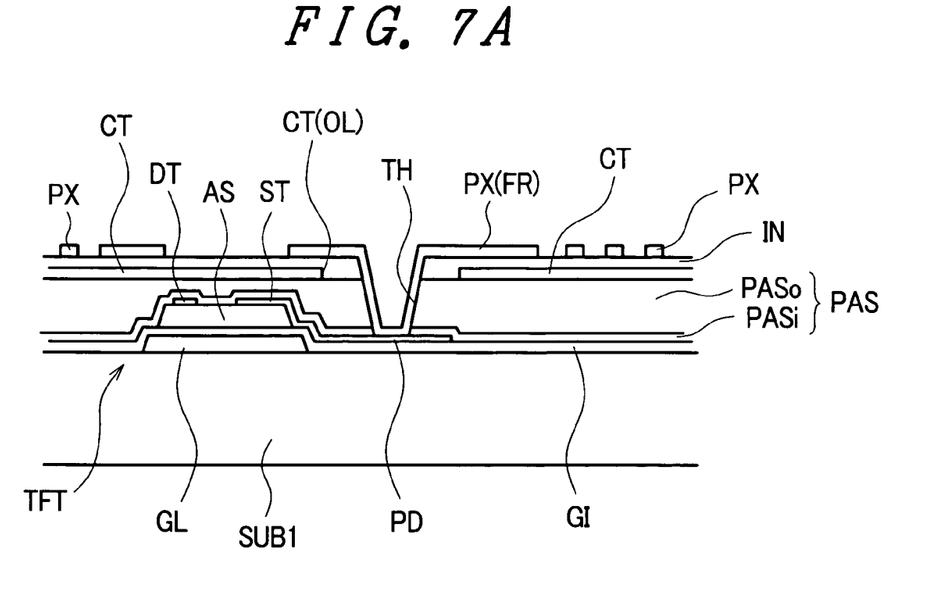
FIG. 7A is a cross-sectional view taken along a line VII(a)-VII (a) in FIG. 5.
Figure 7B:
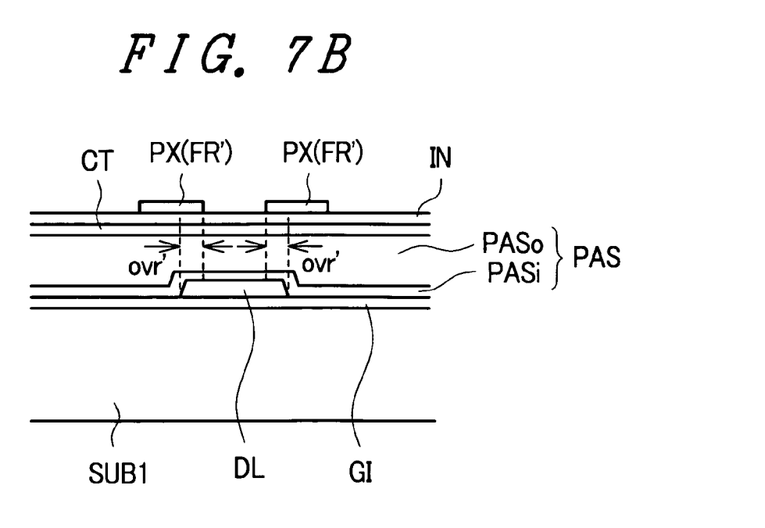
FIG. 7B is a cross-sectional view taken along a line VII(b)-VII(b).

FIG. 5 is a plan view for explaining one example of the liquid crystal display device of an embodiment 2 of the present invention and corresponds to FIG. 3. Further, FIG. 6 is a cross-sectional view taken along a line VI-VI in FIG. 5, FIG. 7A is a cross-sectional view taken along a line VII(a)-VII(a) in FIG. 5, and FIG. 7B is a cross-sectional view taken along a line VII(b)-VII(b) in FIG. 5. Here, FIG. 6 shows a cross section of the liquid crystal display device including a substrate SUB2.

The constitution which makes this embodiment 2 largely different from the embodiment 1 shown in FIG. 3 lies in that the arrangement relationship of the layered structure between the pixel electrode PX and the counter electrode CT of this embodiment 2 is opposite to the corresponding arrangement relationship of the embodiment 1. That is, in this embodiment 2, a counter electrode CT is formed on an upper surface of a protective film PAS which is formed so as to cover thin film transistors TFT and, further, pixel electrodes PX are formed on an insulation film IN which is formed so as to cover the counter electrode CT. In this case, for generating an electric field on a liquid crystal LC side, the counter electrode CT which is formed as a lower layer is formed of a surface transparent conductive film having a planar shape, and the pixel electrode PX which is formed as an upper layer is formed of a transparent conductive film having a plurality of linear portions which is arranged parallel to each other.

To be more specific, the counter electrode CT is formed on the first substrate such that the counter electrode CT reaches neighboring other pixels striding over the gate signal lines GL and the drain signal lines DL which define the pixel. Due to such constitution, in each pixel region, the counter electrode CT is formed on the whole region of the display region AR (see FIG. 2) while avoiding regions where through holes TH described later which are provided for establishing the electrical connection between the thin film transistors TFT and the pixel electrodes PX are formed (a profile of the counter electrode CT being indicated by symbol CT (OL) in FIG. 5).

Further, the pixel electrode PX is independently formed for every pixel region, and includes frame portions PX(FR), PX(FR') which connect peripheral end portions of a plurality of linear portions arranged parallel to each other. The frame portions PX(FR), PX(FR') are provided for electrically connecting electrodes which are respectively formed of the linear portions to each other.

As shown in FIG. 6, in another neighboring pixel which is arranged adjacent to the pixel with the gate signal line GL formed as a boundary therebetween, the gate-signal-line-GL-side frame portion PX(FR) of the pixel electrode PX of the pixel is formed on the substrate SUB1 so as to overlap with the pixel side of the gate signal line GL (indicated by symbol ovr in the drawing), and the gate-signal-line-GL-side frame portion PX(FR) of the pixel electrode PX of another pixel is formed on the substrate SUB1 so as to overlap with the another-pixel-side of the gate signal line GL (indicated by symbol ovr in the drawing).

Accordingly, a gap portion formed between the pixel electrode PX of one pixel and the pixel electrode PX of another pixel which is arranged adjacent to one pixel PX with the gate signal line GL formed as a boundary therebetween can be made small and, at the same time, the gap portion can be positioned above the gate signal line GL. This eventually narrows a range of a region of an electric field which is generated between the respective pixel electrodes PX of the neighboring pixels with the gate signal line GL sandwiched therebetween (that is, an electric field generated between the pixel electrodes PX of the neighboring pixels). Further, this gap portion can be shielded from light by the gate signal line GL. Due to such constitution, as shown in FIG. 6, it is sufficient for the black matrix (light blocking film) BM which is arranged on the substrate SUB2 in an overlapping manner with the gate signal line GL to cover only the gap portion formed between the pixel electrodes PX which are arranged adjacent to each other, and a width w of the black matrix BM may be set smaller than at least a width W of the gate signal line GL.

Here, the pixel electrode PX is connected to a source electrode ST (pad portion PD) of the thin film transistor TFT via a through hole TH formed in an insulation film IN and a protective film PAS. In this case, as described previously, the counter electrode CT is formed while avoiding the regions where the through holes TH are formed.

Further, as shown in FIG. 7B, in another pixel which is arranged adjacent to the pixel with the drain signal line DL formed as a boundary therebetween, the drain-signal-line-DL-side frame portion PX(FR') of the pixel electrode PX of the pixel overlaps with the pixel side of the drain signal line DL (indicated by symbol ovr'), and the drain-signal-line-DL-side frame portion PX(FR') of the pixel electrode PX of another pixel overlaps with another pixel side of the drain signal line DL (indicated by symbol ovr').

Accordingly, a gap portion formed between the pixel electrode PX of one pixel and the pixel electrode PX of another pixel which is arranged adjacent to one pixel PX with the drain signal line DL formed as a boundary therebetween can be made small and, at the same time, the gap portion can be positioned above the drain signal line DL. This eventually narrows a range of a region of an electric field which is generated between the respective pixel electrodes PX of the neighboring pixels with the drain signal line DL sandwiched therebetween (that is, an electric field generated between the pixel electrodes PX of the neighboring pixels). Further, this gap portion can be shielded from light by the drain signal line DL. Due to such constitution, although omitted from FIG. 7B, provided that the black matrix (light blocking film) BM is arranged on the substrate SUB2 in an overlapping manner with the drain signal line DL, it is sufficient for the black matrix BM to cover only the gap portion formed between the pixel electrodes PX, and a width of the black matrix BM may be set smaller than at least a width of the drain signal line DL.

Also in this embodiment, the overlapping portion ovr is formed on the gate signal line GL side and the overlapping portion ovr' is not formed on the drain signal line DL side. As an opposite case, the overlapping portion ovr is not formed on the gate signal line GL side and the overlapping portion ovr' is formed on the drain signal line DL side.

Although the present invention has been explained in conjunction with the embodiments, the constitutions explained heretofore in conjunction with respective embodiments are merely examples, and the present invention can be suitably modified without departing from a technical concept of the present invention. Further, the constitutions explained in conjunction with the respective embodiments may be used in combination unless these constitutions contradict each other.

What is claimed is:

1. A liquid crystal display device having a first substrate and a second substrate which are arranged to face each other with liquid crystal sandwiched therebetween, wherein
   the first substrate forms a plurality of gate signal lines and a plurality of drain signal lines on a liquid-crystal-side surface thereof,
   assuming a region surrounded by a pair of neighboring gate signal lines and a pair of neighboring drain signal lines as a pixel region of one pixel,
   the pixel includes a thin film transistor which is turned on in response to a signal from the gate signal line, a pixel electrode to which a signal from the drain signal line is supplied via the thin film transistor, and a counter electrode which generates an electric field for driving the liquid crystal between the pixel electrode and the counter electrode which are formed on the liquid-crystal-side surface of the first substrate,
   the pixel electrode is formed of a transparent conductive film having a planar shape which is formed in each pixel region on a first insulation film which is formed on the first substrate so as to cover the gate signal line,
   the counter electrode is formed of a transparent conductive film which includes a plurality of linear portions arranged parallel to each other and a frame portion which connects end portions of the linear portions to each other, the transparent conductive film of the counter electrode being formed on a second insulation film which is formed on the first substrate so as to cover the pixel electrode, and the plurality of linear portions of the counter electrode being arranged on the pixel electrode in an overlapping manner, and
   assuming two pixels which are arranged adjacent to each other with the gate signal line formed as a boundary therebetween as a first pixel and a second pixel respectively,
   a gate-signal-line side of the pixel electrode of the first pixel is formed on a first-pixel side of the gate signal line in an overlapping manner, and a gate-signal-line side of the pixel electrode of the second pixel is formed on a second-pixel side of the gate signal line in an overlapping manner, and
   a gate-signal-line-side frame portion of the counter electrode of the first pixel and a gate-signal-line-side frame portion of the counter electrode of the second pixel are formed in common on the gate signal line in a striding manner.

2. A liquid crystal display device according to claim 1, wherein the liquid crystal display device forms a light blocking film which is arranged so as to overlap with the gate signal line on the second substrate, and a width of the light blocking film is set smaller than a width of the gate signal line.

3. A liquid crystal display device according to claim 1, wherein assuming two pixels which are arranged adjacent to each other with the drain signal line formed as a boundary therebetween as one pixel and another pixel respectively,
   a drain-signal-line side of the pixel electrode of said one pixel is formed on one-pixel side of the drain signal line in an overlapping manner, and a drain-signal-line side of the pixel electrode of said another pixel is formed on another-pixel side of the drain signal line in an overlapping manner, and
   a drain-signal-line-side frame portion of the counter electrode of said one pixel and a drain-signal-line-side frame portion of the counter electrode of said another pixel are formed in common on the drain signal line in a striding manner.

4. A liquid crystal display device having a first substrate and a second substrate which are arranged to face each other with liquid crystal sandwiched therebetween, wherein
   the first substrate forms a plurality of gate signal lines and a plurality of drain signal lines on a liquid-crystal-side surface thereof,
   assuming a region surrounded by a pair of neighboring gate signal lines and a pair of neighboring drain signal lines as a pixel region of one pixel,
   the pixel includes a thin film transistor which is turned on in response to a signal from the gate signal line, a pixel electrode to which a signal from the drain signal line is supplied via the thin film transistor, and a counter electrode which generates an electric field for driving the liquid crystal between the pixel electrode and the counter electrode which are formed on the liquid-crystal-side surface of the first substrate,
   the counter electrode is formed of a transparent conductive film having a planar shape which is formed in a state that the transparent conductive film of the counter electrode extends over the neighboring pixel striding over at least the gate signal line, the transparent conductive film of the counter electrode being formed on a first insulation film which is formed on the first substrate so as to cover the gate signal line,
   the pixel electrode is formed of a transparent conductive film which includes a plurality of linear portions arranged parallel to each other and a frame portion which connects end portions of the linear portions to each other, the transparent conductive film of the pixel electrode being formed in each pixel region on a second insulation film which is formed on the first substrate so as to cover the counter electrode, and the plurality of linear portions of the pixel electrode being arranged on the counter electrode in an overlapping manner, and
   assuming two pixels which are arranged adjacent to each other with the gate signal line formed as a boundary therebetween as a first pixel and a second pixel respectively,
   a gate-signal-line-side frame portion of the pixel electrode of the first pixel is formed on a first-pixel side of the gate signal line in an overlapping manner, and a gate-signalline-side frame portion of the pixel electrode of the second pixel is formed on a second-pixel side of the gate signal line in an overlapping manner.

5. A liquid crystal display device according to claim 4, wherein the liquid crystal display device forms a light blocking film which is arranged so as to overlap with the gate signal line on the second substrate, and a width of the light blocking film is set smaller than a width of the gate signal line.

6. A liquid crystal display device according to claim 4, wherein assuming two pixels which are arranged adjacent to each other with the drain signal line formed as a boundary therebetween as one pixel and another pixel respectively,
a drain-signal-line-side frame portion of the pixel electrode of said one pixel is formed on one-pixel side of the drain signal line in an overlapping manner, and a drain-signal-line side of the pixel electrode of said another pixel is formed on another-pixel side of the drain signal line in an overlapping manner.

7. A liquid crystal display device having a first substrate and a second substrate which are arranged to face each other with liquid crystal sandwiched therebetween, wherein
the first substrate forms a plurality of gate signal lines and a plurality of drain signal lines on a liquid-crystal-side surface thereof,
assuming a region surrounded by a pair of neighboring gate signal lines and a pair of neighboring drain signal lines as a pixel region of one pixel,
the pixel includes a thin film transistor which is turned on in response to a signal from the gate signal line, a pixel electrode to which a signal from the drain signal line is supplied via the thin film transistor, and a counter electrode which generates an electric field for driving the liquid crystal between the pixel electrode and the counter electrode which are formed on the liquid-crystal-side surface of the first substrate,
the pixel electrode is formed of a transparent conductive film having a planar shape which is formed in each pixel region on a first insulation film which is formed on the first substrate so as to cover the drain signal line,
the counter electrode is formed of a transparent conductive film which includes a plurality of linear portions arranged parallel to each other and a frame portion which connects end portions of the linear portions to each other, the transparent conductive film of the counter electrode being formed on a second insulation film which is formed on the first substrate so as to cover the pixel electrode, and the plurality of linear portions of the counter electrode being arranged on the pixel electrode in an overlapping manner, and
assuming two pixels which are arranged adjacent to each other with the drain signal line formed as a boundary therebetween as a first pixel and a second pixel respectively,
a drain-signal-line side of the pixel electrode of the first pixel is formed on a first-pixel side of the drain signal line in an overlapping manner, and a drain-signal-line side of the pixel electrode of the second pixel is formed on a second-pixel side of the drain signal line in an overlapping manner, and
a drain-signal-line-side frame portion of the counter electrode of the first pixel and a drain-signal-line-side frame portion of the counter electrode of the second pixel are formed in common on the drain signal line in a striding manner.

8. A liquid crystal display device having a first substrate and a second substrate which are arranged to face each other with liquid crystal sandwiched therebetween, wherein
the first substrate forms a plurality of gate signal lines and a plurality of drain signal lines on a liquid-crystal-side surface thereof,
assuming a region surrounded by a pair of neighboring gate signal lines and a pair of neighboring drain signal lines as a pixel region of one pixel,
the pixel includes a thin film transistor which is turned on in response to a signal from the gate signal line, a pixel electrode to which a signal from the drain signal line is supplied via the thin film transistor, and a counter electrode which generates an electric field for driving the liquid crystal between the pixel electrode and the counter electrode which are formed on the liquid-crystal-side surface of the first substrate,
the counter electrode is formed of a transparent conductive film having a planar shape which is formed in a state that the transparent conductive film of the counter electrode extends over the neighboring pixel striding over at least the drain signal line, the transparent conductive film of the counter electrode being formed on a first insulation film which is formed on the first substrate so as to cover the drain signal line,
the pixel electrode is formed of a transparent conductive film which includes a plurality of linear portions arranged parallel to each other and a frame portion which connects end portions of the linear portions to each other, the transparent conductive film of the pixel electrode being formed in each pixel region on a second insulation film which is formed on the first substrate so as to cover the counter electrode, and the plurality of linear portions of the pixel electrode being arranged on the counter electrode in an overlapping manner, and
assuming two pixels which are arranged adjacent to each other with the drain signal line formed as a boundary therebetween as a first pixel and a second pixel respectively,
a drain-signal-line-side frame portion of the pixel electrode of the first pixel is formed on a first-pixel side of the drain signal line in an overlapping manner, and a drain-signal-line-side frame portion of the pixel electrode of the second pixel is formed on a second-pixel side of the drain signal line in an overlapping manner.

* * * * *